GAS CHROMATOGRAPH LOG

JOHN M. HORETH
WILLIAM D. HOWARD   INVENTORS
RICHARD H. LANGENHEIM

BY *Gary C. Honeycutt*

ATTORNEY

CHROMATOGRAPH PRINTOUT CYCLE

United States Patent Office 3,462,761
Patented Aug. 19, 1969

3,462,761
AUTOMATIC MUD LOG PRINTOUT SYSTEM
John M. Horeth, William D. Howard, and Richard H. Langenheim, Houston, Tex., assignors to Esso Production Research Company, a corporation of Delaware
Filed Jan. 20, 1966, Ser. No. 521,889
Int. Cl. G01d 9/10
U.S. Cl. 346—1                                6 Claims

ABSTRACT OF THE DISCLOSURE

A method and an apparatus for recording the light hydrocarbon content of drilling fluids as a function of drilling depth. The chromatographic analysis of individual components of the hydrocarbons are transmitted to a recorder and individually recorded. The advance of the recorder is controlled by the drilling depth at the time of the analysis and in a more limited embodiment the advance of the recorder is controlled so that the analysis is reproduced on the depth scale at a point at which the hydrocarbons are introduced into the mud stream.

---

This invention relates to the sequential, intermittent recording of at least two variables. A method and apparatus are provided for obtaining a separate base line for the record of each variable.

In accordance with a more limited aspect, the invention relates to the drilling of boreholes in the earth, and more particularly, to the logging of a rotary drilling operation by the periodic sampling and analysis of the drilling fluid to determine its light hydrocarbon content. A method and apparatus are provided for obtaining an automatic printout of a log which relates the analysis of individual hydrocarbons to drilling depth.

It is common practice in the drilling of oil and gas wells to sample and analyze drilling fluid returns from bottomhole to determine the nature of the strata being traversed by the drill. In this manner, direct evidence is obtained indicative of the presence or absence of oil and gas in the formations being penetrated. The presence of hydrocarbon gases and other light hydrocarbons in the drilling mud returns, even in amounts of only a few parts per million, is frequently the first and most reliable indication of the likelihood that a commercially productive well can be completed. This amount if hydrocarbons entrained, dissolved, or occluded in the mud stream is much too small to be determined by observation or by simple analytical means. Specialized equipment and techniques are required.

Recent advances in gas chromatography have led to the development of commercially available devices which provide an accurate and dependable analysis of light hydrocarbons, subject primarily to the requirement that the sample supplied to the chromatograph be substantially free of certain contaminants, including particularly water and heavy hydrocarbons. It has thus become desirable that field apparatus and procedures for sampling the return mud stream be further developed and improved for the purpose of eliminating errors which are usually inherent in manual operations, including primarily the loss of hydrocarbon gases from the mud return stream due to exposure of the mud to the atmosphere. The development of such apparatus and procedures has been the subject of our prior copending application, Ser. No. 294,674 filed July 12, 1963, now U.S. Patent 3,240,068, issued Mar. 15, 1966, and a continuation-in-part thereof, Ser. No. 511,930, filed Dec. 6, 1965.

The method of the present invention is concerned primarily with the operation of automatic recording devices, such as an ordinary strip-chart recorder, the essential components of which include marker means, record means, and drive means for both the marker and the record. It is the usual practice to operate the record drive at a constant speed, whereby the record obtained of the input signal to the marker drive means is related to time alone. Frequently, however, a relation to time is not of primary interest. For example, in the logging of a rotary drilling operation where periodic samples of the drilling fluid are analyzed for hydrocarbon content, it is desirable that each analysis be related to drilling depth or source depth. Thus, it is one feature of the invention to control the operation of the record drive means of a log recorder in accordance with drilling depth as determined by conventional means.

It has also been considered acceptable previously to obtain a single, continuous plot of the chromatograph output, even though portions of such a plot reflect methane content, other portions reflect ethane, others propane, etc. It would be possible to use a multi-pen recorder, and pass the chromatograph output in rotation from one pen-drive means to the next, and so on, with only one pen being utilized at a given instant. In such a manner, separate plots would be obtained for the analyses of separate hydrocarbons, as desired. The method of the present invention produces a separate base line for the record of each hydrocarbon, using a single-pen recorder.

The method comprises the step of periodically switching a single marker drive means from one selected input signal to another, while simultaneously supplying to the marker drive means a preselected bias signal in series with the respective input signal, each successive bias signal differing substantially in magnitude from the preceding bias signal, whereby a plural-channel record is obtained, the base line of each channel corresponding to a given bias signal.

In the logging of a rotary drilling operation, for example, each input signal to the marker drive is obtained by selecting a portion of the output from the the chromatograph measuring circuit, each selected portion corresponding to the analysis of a particular hydrocarbon. A series of bias signals is also supplied to the marker drive, each successive bias corresponding to a given hydrocarbon. As the chromatograph cycle progresses from propane analysis to normal butane analysis, for example, the measuring circuit output is switched from the propane bias signal to the n-butane bias, and so on, until the desired number of analyses are completed, and the cycle is then repeated.

In accordance with one embodiment, the apparatus of the invention comprises a recorder equipped with record drive means and marker drive means, in combination with a switching device for sequentially connecting and disconnecting each of a series of electrical signals with the marker drive means. The apparatus further includes circuitry for adding a predetermined bias to each of the signals during the time each signal is connected to the marker drive means.

In accordance with a more limited embodiment, the apparatus further includes means for interrupting the marker means during selected intervals, timed to coincide with the switching of the marker drive means from one signal to another.

When specifically adapted for use in obtaining a log of hydrocarbon gases in the drilling fluid of a rotary drilling operation, the measuring circuit of a gas chromatograph is connected as the input to the switching device of the above combination. The record drive is controlled by a signal received from a depth recorder operated in combination with a rotary drilling rig, in accordance with conventional practice. In a still more limited embodiment, means for delaying the depth recorder signal are provided in order that the printed record may relate each analysis to the source depth of the mud sample instead of to the drilling depth at the time of analysis.

It is an object of the present invention to further improve the sampling and logging systems of our prior applications by providing a method and apparatus for automatically relating the chromatograph analyses to drilling depth. More particularly, it is an object of the present invention to obtain an automatic printout of a mud gas log consisting of a plurality of separate plots, each of which has a separate base line and is a continuous or semi-continuous record of the concentration of a single hydrocarbon versus drilling depth. In a more limited embodiment, it is a further object of the invention to lag the drilling depth component of the printout such that the analysis for each individual hydrocarbon is related automatically to the actual drilling depth at which the hydrocarbon became entrained in the drilling fluid.

These further objects of the invention will become apparent from the following detailed description of the preferred embodiment of the invention.

Figure 1:
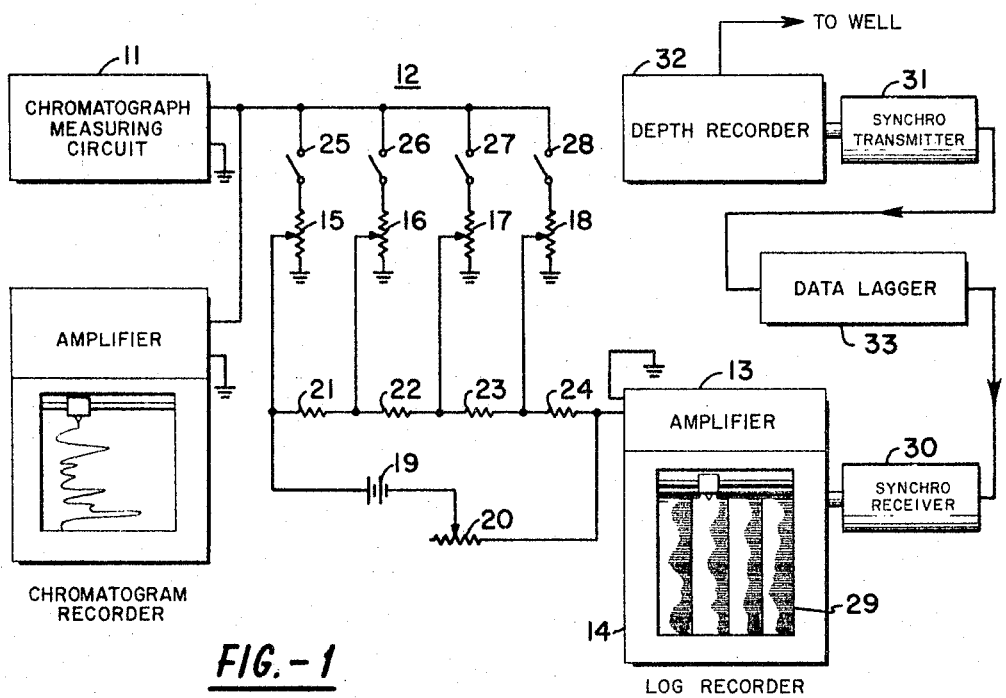
FIGURE 1 is a schematic diagram outlining the system of the invention.

In FIGURE 1 the electrical output of chromatograph measuring circuit 11 is connected through attenuator and bias circuits 12 to amplifier 13 of log recorder 14. The attenuator and bias circuits consist of potentiometers 15, 16, 17, and 18, bias cell 19, voltage divider 20, resistances 21, 22, 23, and 24 and switches 25, 26, 27, and 28, which select the proper potentiometer-bias circuit combination for the recording of each gas analysis.

Switches 5 through 28 are operated by a system of cams, driven for example by a ¼ r.p.m. synchronous motor. The motor is triggered every six minutes, for example, by a pulse from the chromatograph switching circuits. Each switch is closed during only that period of time which corresponds to the transmission of a selected output from measuring circuit 11. For example, switch 25 is closed while the chromatograph analyzes the methane component of each successive sample, thereby connecting the output from circuit 11 with recorder 14, in series with bias voltages developed across resistors 21, 22, 23, and 24 by bias cell 19.

The bias network causes the log recorder pen to establish a new base line for each hydrocarbon gas to be recorded. The resistance values 21 through 24 are preferably chosen such that 40% of the chart width is available for recording methane, and 20% for each of propane, normal butane, and pentane plus heavier hydrocarbons.

The recorder pen is lifted each time the pen is shifted from one base line to another to prevent the continuous recording of lines across the chart, which would obscure the desired signals. The pen is also lifted during those periods of time during which the analyzer may be producing transients which correspond to sample components whose concentrations it is not desired to record. The pen-lifting mechanism may be actuated by the closing of a switch operated by a cam mounted on the same shaft as the cams which close switches 25 through 28.

The recorder chart 29 is driven by synchro-receiver 30 whose transmitter 31 is operated by depth recorder 32, whereby the chart will travel a fixed number of inches for each hundred feet of hole drilled. For example, it has been found convenient to have the chart travel five inches per hundred feet of hole drilled in order to facilitate the correlation of the gas log with wireline logs carried out in the same or nearby wells.

Optionally, the system may also include data lagging system 33, actuated for example by a pump stroke counter (not shown) and depth recorder 32. The purpose of the data lagging system is to coordinate the operation of synchro-receiver 30 with the actual source depth of the sample being analyzed, instead of the drilling depth at the time of analysis. In addition to the convenience of lagging the printout, this system will allow the equipment to continue producing a log during periods of mud circulation without continued drilling.

Figure 2:
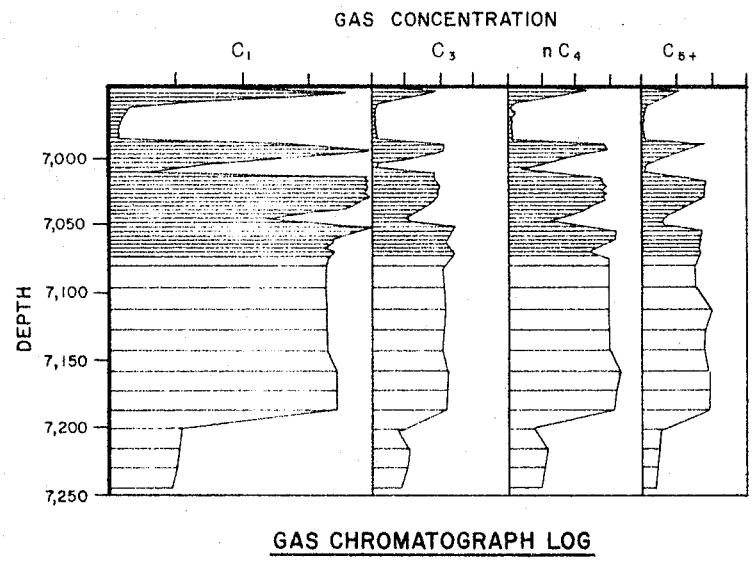
FIGURE 2 shows an example of a log printed in accordance with the invention.

FIGURE 2 is an example of the multi-channel printout obtained in accordance with the invention, using a single-channel recorder. The pen first traces out a methane ($C_1$) peak, from left to right near the left-hand margin of the chart, and is then lifted, for a predetermined interval, until the time arrives for the propane analysis output to begin. The pen is then lowered for tracing out a propane ($C_3$) peak. If desired, an ethane ($C_2$) peak can be printed; however, in the embodiment shown, the pen remains lifted during $C_2$ analysis. The remaining peaks are traced in the same manner, and the cycle is repeated, beginning again with $C_1$.

In FIGURE 2 the peaks are represented by the horizontal lines, with the adjacent peaks having been connected manually to form the indicated continuous envelopes for ease of study and interpretation.

Figure 3:
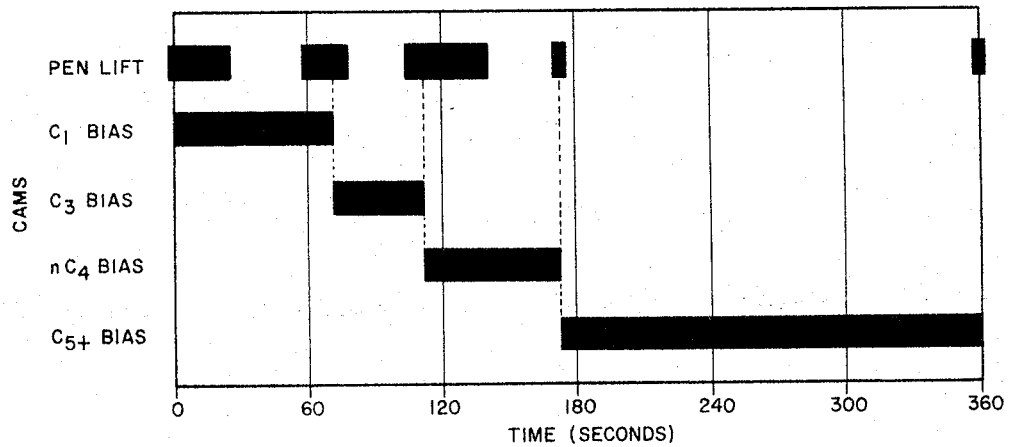
FIGURE 3 illustrates the timing sequence of a cam assembly used for coordinating the selection of attenuator and bias circuits corresponding to the respective hydrocarbon analyses.

In FIGURE 3 the timing sequence is shown for the operation of switches 25, 26, 27, and 28 (FIGURE 1). The timing of the pen-lifting mechanism is also shown. This timing sequence is readily achieved by a conventional cam assembly driven by a synchronous motor. A suitable sample is the industrial sequence timer, Catalog No. 15 TM4M, obtained from P. R. Mallory Company, Inc. of Indianapolis, Ind.

For purposes of this disclosure, the terms "marker drive means," "pen-drive means," and "pen-lifting means" are intended to be generic and therefore to include equivalent elements, such as a stylus-drive, pencil-drive, type-drive, and other known elements for making a record.

Figure 4:
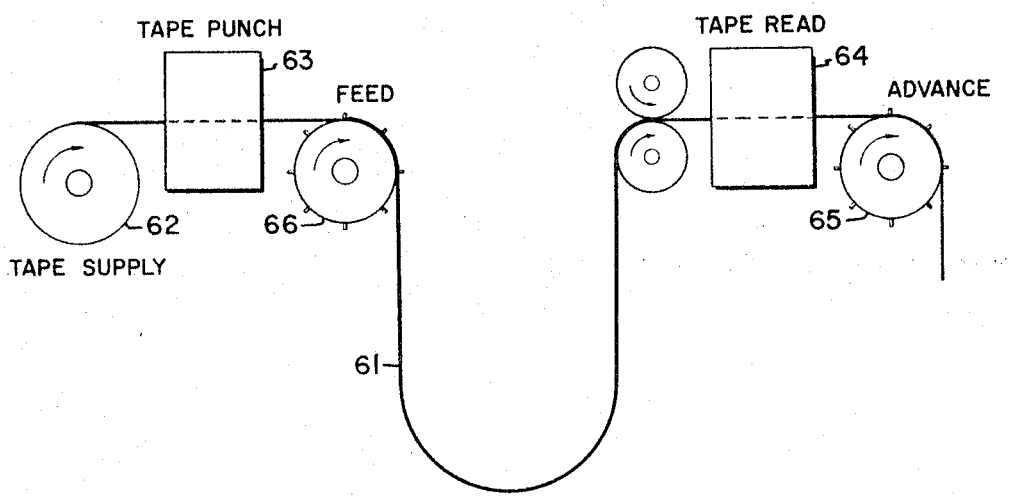
FIGURE 4 is a schematic diagram of a data lagger.

In FIGURE 4, data lagger 33 is shown, wherein paper tape 61 is passed from drum 62 through tape punch 63 and tape reader 64. The tape is advanced by sprocket 65 at a rate which is proportional to the volumetric flow rate of the drilling fluid. The angular velocity of sprocket 65 may suitably be obtained through suitable gearing from a stepping motor actuated by a mud pump-stroke counter. The angular velocity of sprocket 66 is maintained equal to the sum of the angular velocity of sprocket 65, plus an incremental velocity proportional to the rate of increase of drilling depth, or more specifically, proportional to the rate of increase in the volume of the well annulus. A signal proportional to such rate of increase may be suitably obtained from an electrical switch or a synchro transmitter actuated from the shaft of depth recorder 32. These two velocity components may readily be combined, and the sum imparted to sprocket 66, by means of a mechanical differential—for example, Model 07603 of Insco Corporation of Groton, Mass. By the proper selection of gearing and the initial setting of distances, such that the transit time of the tape from punch 63 to reader 64 is equal to the mud lag time, the lagging mechanism will maintain the proper lag time for all succeeding drilling depths, until the borehole gauge diameter is changed.

A suitable tape punch and tape reader combination may be obtained from Tally Corporation of Seattle, Wash.—for example, Model 1477. The existing tape advance mechanisms of the punch and reader may simply by disconnected in order to permit complete tape advance control by sprockets 65 and 66 as described above. As an alternative, the tape advance mechanisms of a commercially available punch and reader combination may be modified to control tape speed in accordance with the operation described for lagger 33.

What is claimed is:

1. A method of recording the hydrocarbon content of a drilling fluid employed in a well drilling operation and which circulates from the bottom of the well to the surface through the annulus between the drill string and the wall of the well which comprises chromatographically separating preselected hydrocarbons contained in the drilling fluid; generating a series of electrical transients indicative of the preselected hydrocarbons; biasing each of the electrical transients by a predetermined amount; advancing a record medium in response to drilling depth; and recording on the record medium in synchronism with drilling depth a trace which quantitatively indicates each of the series of biased electrical transients to obtain a record of the presence and quantity of the preselected hydrocarbons with depth.

2. A method as defined in claim 1 wherein the advance of the record medium is lagged by a period of time directly proportional to the volume of drilling fluid flowing in the annulus between the bottom of the well and the surface and inversely proportional to the flow rate of the drilling fluid.

3. A method for recording the quantities of light hydrocarbons contained in a well drilling mud which circulates from the bottom of the well to the surface through the annulus between the drill string and the wall of the well which comprises chromatographically separating the light hydrocarbons at the surface to determine the presence and quantity of such hydrocarbons; generating signals in response to the separation of the hydrocarbons which are indicative of the type and quantity of hydrocarbons present in the drilling mud; biasing each of the signals by a different and predetermined amount, the magnitude of the bias being distinctive for each of the hydrocarbons; generating a depth signal indicative of the drilling depth at the time the hydrocarbons are separated; lagging the generated depth signal by an amount directly proportional to the volume of the annulus and inversely proportional to the drilling mud flow rate; advancing a record medium in response to the lagged depth signal; and recording on the record medium in response to each biased signal a record trace reflecting the type and quantity of hydrocarbons introduced into the drilling mud at various depths.

4. Apparatus for recording the hydrocarbon content of a drilling fluid in a rotary drilling operation comprising a recorder equipped with record drive means and marker drive means; means for sequentially connecting and disconnecting each of a series of electrical transients with said marker means, said transients being generated by the measuring circuit of a gas chromatograph; means for adding a predetermined bias signal to each of said transients during the time each of said transients connected to said marker drive means; and means for controlling said record drive means in response to the output signal generated by a rotary drilling rig depth recording means.

5. Apparatus as defined by claim 4 further comprising means for lagging the output signal from depth recording means for a period of time proportional to the volume of the wellbore annulus and inversely proportional to the volumetric flow rate of the drilling fluid.

6. Apparatus as defined by claim 5 wherein said means for lagging the output signal from said depth recording means comprises a supply of paper tape, a tape punch mechanism, a tape read mechanism, and means for passing said tape through said tape punch mechanism at a rate proportional to the volumetric flow rate of the drilling mud plus the rate of increase of drilling depth, and means for passing the resulting punched tape through said tape read mechanism at a rate proportional to the volumetric flow rate of the drilling fluid, whereby the time lag required for a given increment of said punched paper to traverse the distance between said tape punch mechanism and said read mechanism is equal to the time required for a given mud sample to traverse the distance from the borehole bottom to the sampling mechanism of said gas chromatograph.

References Cited

UNITED STATES PATENTS

| 2,692,755 | 10/1954 | Nowak | 73—153 X |
| 2,714,308 | 8/1955 | Heck | 73—153 |
| 3,031,571 | 4/1962 | Fearon | 73—153 X |
| 1,641,199 | 9/1927 | Roucka | 346—34 |
| 2,625,458 | 1/1953 | Ruhland | 346—34 |
| 2,793,094 | 5/1957 | Bergson | 346—62 |
| 2,899,258 | 8/1959 | Spracklen | 346—34 |
| 3,058,111 | 10/1962 | Duncombe et al. | 346—34 |

OTHER REFERENCES

Sokolov, V. A.: The Applications of Gas Chromatography to Geochemical Prospecting for Oil and Gas, Gas Chromatography 1960, Butterworths, pp. 331 and 332.

RICHARD B. WILKINSON, Primary Examiner

J. W. HARTARY, Assistant Examiner

U.S. Cl. X.R.

73—23.1, 153; 346—34